United States Patent
Kramer et al.

(10) Patent No.: US 10,280,104 B2
(45) Date of Patent: May 7, 2019

(54) METHOD FOR REMOVING MERCURY FROM WASHER SUSPENSIONS

(71) Applicant: Andritz AG, Graz (AT)

(72) Inventors: Michael Kramer, Graz (AT); Harald Reissner, Vasoldsberg (AT)

(73) Assignee: Andritz AG, Graz (AT)

( * ) Notice: Subject to any disclaimer, the term of this patent is extended or adjusted under 35 U.S.C. 154(b) by 502 days.

(21) Appl. No.: 15/091,989

(22) Filed: Apr. 6, 2016

(65) Prior Publication Data

US 2016/0304374 A1    Oct. 20, 2016

(30) Foreign Application Priority Data

Apr. 15, 2015 (AT) ................ A 50298/2015

(51) Int. Cl.
| | |
|---|---|
| *C02F 9/00* | (2006.01) |
| *C02F 1/24* | (2006.01) |
| *C02F 1/38* | (2006.01) |
| *B01D 53/50* | (2006.01) |
| *B01D 53/64* | (2006.01) |
| *B01D 53/80* | (2006.01) |
| *C02F 1/00* | (2006.01) |
| *C02F 101/20* | (2006.01) |
| *C02F 103/18* | (2006.01) |

(52) U.S. Cl.
CPC .............. *C02F 9/00* (2013.01); *B01D 53/501* (2013.01); *B01D 53/64* (2013.01); *B01D 53/80* (2013.01); *C02F 1/24* (2013.01); *C02F 1/38* (2013.01); *C02F 1/385* (2013.01); *B01D 2251/404* (2013.01); *B01D 2257/602* (2013.01); *B01D 2258/0283* (2013.01); *C02F 2001/007* (2013.01); *C02F 2101/20* (2013.01); *C02F 2103/18* (2013.01); *C02F 2301/08* (2013.01)

(58) Field of Classification Search
CPC ...... C02F 9/00; C02F 1/24; C02F 1/38; C02F 1/385; C02F 2001/007; C02F 2101/20; C02F 2103/18; C02F 2301/08; B01D 53/64; B01D 53/80; B01D 53/501; B01D 2251/404; B01D 2257/602; B01D 2258/0283

See application file for complete search history.

(56) References Cited

U.S. PATENT DOCUMENTS 9,139,449 B2    9/2015    Kramer et al.
2015/0040761 A1    2/2015    Kramer

FOREIGN PATENT DOCUMENTS

WO    WO2010/089309 A1    8/2010
WO    WO-2013117341 A1 *  8/2013    ............... B04C 5/26

* cited by examiner

*Primary Examiner* — David A Reifsnyder
(74) *Attorney, Agent, or Firm* — Alix, Yale & Ristas, LLP

(57) ABSTRACT

A method for removing mercury from flue gas in a flue gas desulfurization plant, in which the mercury concentration in the FGD gypsum is reduced without increasing the size of the waste water treatment plant, by increasing the volume-related mercury concentration in the wash wastewater and feeding this more concentrated flow of waste water to the waste water treatment plant.

10 Claims, 1 Drawing Sheet

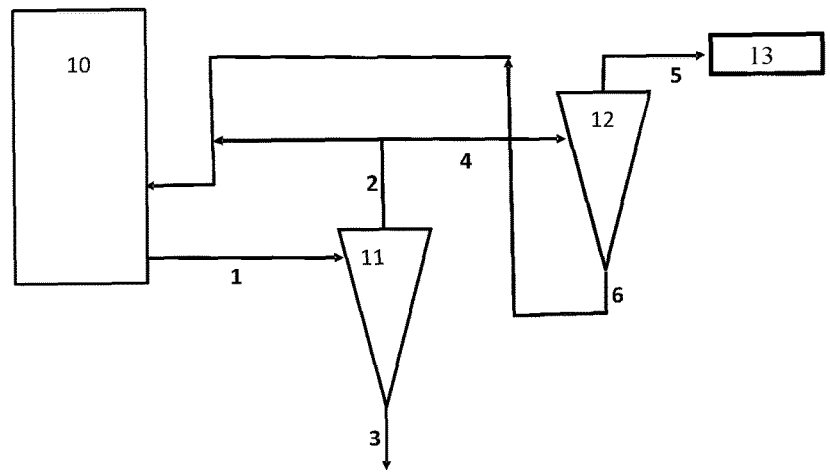
Fig. 1 – Prior Art
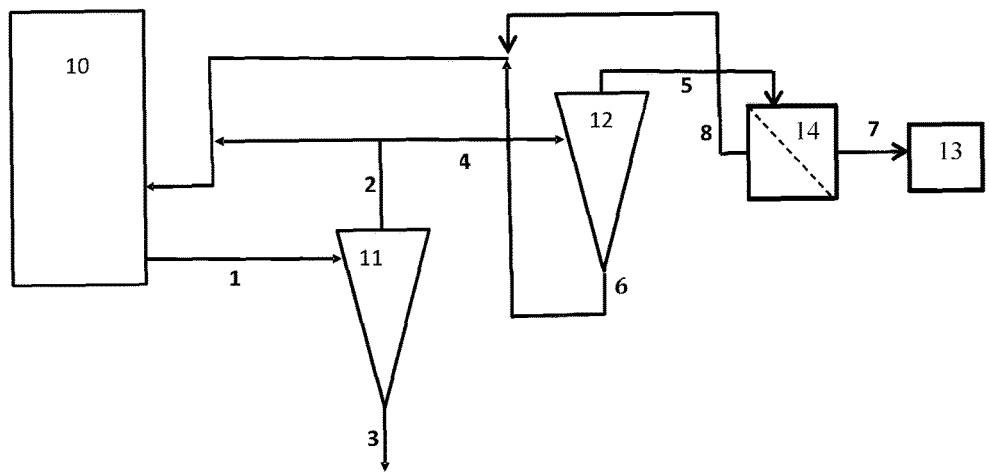
Fig. 2

METHOD FOR REMOVING MERCURY FROM WASHER SUSPENSIONS

BACKGROUND

The present invention is directed to a method for removing mercury in a flue gas desulfurization process.

Wet flue gas desulfurization is a process for removing sulfur compounds from the waste gases produced, for example, in power stations, waste incineration plants, or by large engines. The sulphur compounds arise due to the incineration of fuels containing sulfur, which are mainly fossil fuels. The plants for flue gas desulfurization are abbreviated as FGD (flue gas desulfurization plant). A flue gas desulfurization plant can also be used for the recovery of gypsum (FGD gypsum). This type of gypsum recovery has been in the state of the art for a long time.

In this known process, the gypsum suspension that collects in the scrubber contains the mercury. This suspension is thickened using at least one gypsum cyclone (hydrocyclone) and the thickened gypsum suspension is discharged with the underflow from the hydrocyclone. The overflow from the hydrocyclone is fed to at least one waste water cyclone to recover the solids, and the overflow from the waste water cyclone is then treated or cleaned subsequently in a waste water treatment plant (WWTP). The thickened suspension in the underflow from the hydrocyclone is further dewatered to the final dry content by band filters or a centrifuge. The gypsum quality normally has to satisfy requirements as to degree of purity.

In addition to desulfurization in the wet scrubber, mercury and halogen compounds contained in the flue gas are also removed and carried out of the scrubber with the gypsum suspension. When mercury is removed from combustion gases, especially when generating electricity from coal, plants are confronted with the problem of the mercury already removed from the flue gas, being re-emitted from the wet scrubber.

Oxidized mercury species (in the form of $HgX_2$, $X=Cl$, $Br$, $I$) are soluble in water and can thus be removed effectively from the flue gas together with the other acid components in the flue gas. Depending on the washer chemistry, the mercury integrated into the wash water is dissolved (but not generally dissociated); as an alternative, complexing by means of halogen salts or an adsorptive bond, especially to fines containing carbon, is possible. Dissolved (oxidized) mercury can re-emit due to its own steam pressure; as an alternative, reductive destruction of the compound is possible, releasing elementary (water-insoluble) mercury, which then re-emits entirely as a result.

This problem can be dealt with by transforming the dissolved mercury species into an adsorbed form. This could be achieved with adsorbents based on active coal, for example, or by precipitating the relevant contaminants in the washer loop (e.g., with sulfide precipitants). The adsorptively bound mercury is found preferentially on a fine-particle fraction, while coarse-grained solids remain more or less mercury-free.

The gypsum recovery systems commonly used in the wet flue gas desulfurization process (see FIG. 1) mainly comprise a gypsum cyclone 11 followed by a belt filter (not shown in FIG. 1) and a waste water cyclone 12 for recovery of solids before the waste water treatment plant 13. The hydrocyclones used here are distinguished by the fact that they concentrate particles that sink more quickly in the underflow. All particles are concentrated here regardless of their size (except colloidal systems) if they have a higher density than the fluid in the underflow. Nearly all large particles are removed, and very small ones only accumulate to a small extent.

The result is increased mercury input to the cyclone underflow and thus to the FGD gypsum product because the mercury is attached to the fines fraction (which also has a higher concentration). Depending on the operating mode and volume of waste water/type of cyclone, up to 90% of the mercury load can end up in the gypsum. The volume-related mercury content in the overflow is reduced slightly via the cyclone stage. That means that the concentration discharged after a two-stage cyclone process settles under the particles in the washer.

This can be improved by using the wash water cyclone technology described in PCT/EP2013/000379, now U.S. Pat. No. 9,139,449. With this technology, additional water is added in order to reduce the concentration of fines in the underflow. Systems of this kind reduce the mercury load in the cyclone underflow by ~20-30%. However, the gypsum continues to be the main point of accumulation in the process. The cyclone overflow has slightly higher mercury content than when using a conventional cyclone.

This problem becomes more relevant against the backdrop of the discussion on emission limits for mercury because a stringent tightening of limits is expected. In view of the prevailing plant arrangements depicted in FIG. 1 (boiler-SCR-ESP-WFGD), the most economical separation process can be expected in the washer.

Two-stage gypsum dewatering (gypsum washing) with intermediate dilution using process water would be a feasible variant. In this way, highly pure and almost mercury-free gypsum would be conceivable, although the Hg inventory in the washer would then continue to increase until the load incorporated (by means of flue gas) reaches the same level as the load discharged in the waste water flow. This status requires very high mercury concentrations in the washer, which in turn tend to cause greater re-emission into the clean gas.

The problem is that coal-fired power stations usually have relatively small amounts of waste water. In relation to the electricity required for preliminary dewatering of gypsum, the waste water quantity is in a range <10%, often in a range between 5 and 7%. In order to ensure high mercury load in the waste water treatment plant, the concentration must be correspondingly high, which leads in turn to increased re-emissions in the washer.

Accordingly, if the Hg transfer to the gypsum is to be reduced, the waste water quantity must be increased. However, this means that more equipment is required in the waste water cleaning plant. As an alternative, the Hg transfer to the FGD gypsum can be reduced with a modified form of gypsum pre-dewatering (using a wash cyclone). However, this means a significant increase in Hg in the washer with a higher tendency towards re-emission if no additional measures are implemented.

SUMMARY

The object of the present invention is to provide a method by which mercury can be removed reliably from flue gases, with the mercury concentration in the FGD gypsum reduced without increasing the size of the waste water treatment plant.

This object is achieved by increasing the volume-related mercury concentration in the wastewater and feeding this more concentrated flow of waste water to the waste water treatment plant.

According to the present disclosure, a mercury concentrating stage is located upstream of the entry to the waste water treatment plant. As a result, a high mercury load is fed to the waste water treatment plant on the one hand, with a low volume flow at the same time. In addition, the mercury level in the washer is lowered. An important feature of this process is a significantly lower mercury concentration in the washer compared to the waste water flow.

The filtrate (accept) produced when the concentration is increased can be used elsewhere in the washer system. The "high-density" material is fed to the WWTP.

The technology is particularly effective in combination with a washing stage for the FGD gypsum. This can be a wash water cyclone, for example, or a two-stage cyclone with intermediate dilution, as described in PCT/EP2013/000379 (now U.S. Pat. No. 9,139,449, the disclosure of which is hereby incorporated by reference).

The fine material fraction in the underflow can be depleted by applying simple intermediate dilution within one cyclone or by displacement of the liquid phase in the underflow as a result of targeted addition of wash water in metered doses. In this connection, WO 2010/089309 A1 discloses counter-current classification. However, intermediate dilution must take place by using a fluid stream that does not contain the problematic fraction.

Furthermore, another wash water cyclone that could be used is described in U.S. Pat. No. 9,139,449. Here, water is fed to the hydrocyclone through a dedicated feed pipe in addition to the gypsum suspension, thus resulting in fine material depletion in the underflow in relation to the suspension volume.

In this way, up to 90% of the total mercury brought into the washer can be discharged into the WWTP, and the purity of the FGD gypsum can approach that of natural gypsum at the same time (~0.1 mg/kg DS, depending very much on the operating status).

All process engineering operations that enable an increase in solids concentration (centrifuges, sedimenters, flotation, and similar) are feasible as concentration stages.

It can thus be understood that the presently disclosed method influences the liquid balance of gypsum dewatering systems in a controlled way by removing a thickened waste water flow with fines containing active carbon loaded with mercury or precipitated mercury compounds in order to obtain the smallest possible plant sizes in the waste water treatment stage.

BRIEF DESCRIPTION OF THE DRAWING

An embodiment according to the invention is described below with reference to the drawing, in which:

FIG. 1 shows a schematic diagram according to the state of the art; and

FIG. 2 shows a schematic process diagram for an exemplary embodiment of the process according to the invention.

The same reference symbols in the two figures designate the same components or material flows in each case.

DETAILED DESCRIPTION

FIG. 1 shows a conventional process, where a gypsum suspension 1 containing mercury is produced in the scrubber 10 of a flue gas desulphurization plant. The gypsum suspension 1 is fed to a gypsum cyclone (hydrocyclone) 11, and the thickened gypsum suspension is discharged with the underflow 3. The overflow 2—often only a part 4 of the overflow 2—is fed to a waste water cyclone 12. In the waste water cyclone 12, solids like gypsum or residual carbonate are recovered in the underflow 6 and returned to the scrubber 10. The overflow 5 from the waste water cyclone 12 is fed to a waste water treatment plant 13, where the mercury it contains is separated from the remaining waste water.

FIG. 2 shows a simple exemplary embodiment of a process according to the invention. Here, the overflow 5 from the waste water cyclone 12 is fed to a concentrator 14. In the concentrator 14, the overflow 5 is "thickened". The solids to which the mercury is attached are concentrated and the mercury concentration thus increased; this concentrated waste water flow 7 is then fed to the waste water treatment plant 13.

The mercury is essentially present as attached adsorptively to a fines fraction. If these solids with attached mercury can be concentrated in the waste water flow with suitable process management, a high waste water load is possible with a low volume flow at the same time. As a result, the WWTP can be kept small.

The concentrator 14 can be a centrifuge, for example, a sedimenter, a flotation plant, or similar. The filtrate 8, which is the material flow depleted of mercury, is fed again to the scrubber 10.

In a preference, water can fed to the gypsum hydrocyclone 11 through a dedicated feed pipe 15 in addition to the gypsum suspension 1, thus resulting in fine material depletion in the underflow 3 in relation to the suspension volume.

Other embodiments are also possible, where the hydrocyclone 11 is designed as a washing cyclone, for example, or where the gypsum is dewatered in two stages with intermediate dilution. This combination of two hydrocyclones is shown in FIG. 2 of U.S. Pat. No. 9,139,449 (hydrocyclones 1, 1' and dilution water 22). In the two-stage gypsum dewatering process with intermediate dilution using process water of FIG. 2 of U.S. Pat. No. 9,139,449, to thicken the gypsum suspension, two hydrocyclones are connected in series. The underflow from the first hydrocyclone in this case forms the inflow to the second hydrocyclone. The second hydrocyclone likewise has a cylindrical inflow region, a conical region and likewise a water supply. The thickened gypsum suspension form the underflow of the second hydrocyclone is then supplied to a belt drier. The overflow of the second hydrocyclone may be combined with the overflow of the wastewater cyclone. Between the two hydrocyclones, diluting water may optionally be supplied for intermediate dilution.

The invention claimed is:

1. A method for removing mercury in a gypsum suspension (1) produced in a scrubber (10) of a wet flue gas scrubbing plant, comprising:

thickening said suspension (1) by at least one gypsum hydrocyclone (11);

discharging the thickened suspension from the gypsum hydrocyclone (11) as underflow (3);

discharging a first overflow waste water containing solids including mercury attached to fine material, from the gypsum hydrocyclone (11) and feeding said discharged first overflow waste water to at least one waste water cyclone (12), where solids are recovered and second overflow waste water (5) containing mercury attached to fine material is discharged;

feeding the discharged second overflow wastewater containing a concentration of mercury attached to fine material, into a mercury concentrator (14) where water (8) is separated and the mercury concentration is thereby increased in a third flow of wastewater;

delivering the third flow of wastewater with increased mercury concentration (7) to a water treatment plant (13), wherein the water (8) separated during concentration is fed to the scrubber (10).

2. The method according to claim 1 wherein water is fed to the gypsum hydrocyclone (11) through a dedicated feed pipe in addition to the gypsum suspension (1), thus resulting in fine material depletion in the underflow (3) in relation to the suspension volume.

3. The method according to claim 2, wherein the gypsum is washed in two-stage gypsum dewatering with intermediate dilution using process water.

4. The method according to claim 2 wherein the concentration of the second overflow waste water (5) containing mercury is increased by one of a centrifuge, a sedimenter, or by flotation.

5. The method according to claim 1 wherein the gypsum is washed in two-stage gypsum dewatering with intermediate dilution using process water.

6. The method according to claim 1 wherein the concentration of the second overflow waste water (5) containing mercury is increased by one of a centrifuge, a sedimenter, or by flotation.

7. The method according to claim 1 wherein water is fed to the gypsum hydrocyclone (11) through a dedicated feed pipe in addition to the gypsum suspension (1), thus resulting in fine material depletion in the underflow (3) in relation to the suspension volume.

8. The method according to claim 1, wherein the gypsum is washed in two-stage gypsum dewatering with intermediate dilution using process water.

9. The method according to claim 1, wherein the concentration of the second overflow waste water (5) containing mercury is increased by one of a centrifuge, a sedimenter, or by flotation.

10. The method of claim 1,
water is fed to the gypsum hydrocyclone (11) through a dedicated feed pipe in addition to the gypsum suspension (1), thus resulting in fine material depletion in the underflow (3) in relation to the suspension volume;
the gypsum is washed in two-stage gypsum dewatering with intermediate dilution using process water; and
the concentration of the overflow waste water (5) containing mercury is increased by one of a centrifuge, a sedimenter, or by flotation.

* * * * *

UNITED STATES PATENT AND TRADEMARK OFFICE
CERTIFICATE OF CORRECTION

PATENT NO. : 10,280,104 B2  
APPLICATION NO. : 15/091989  
DATED : May 7, 2019  
INVENTOR(S) : Michael Kramer and Harald Reissner Page 1 of 1

It is certified that error appears in the above-identified patent and that said Letters Patent is hereby corrected as shown below:

In the Claims

Column 6, Line 13 Claim 10:
After "The method of claim 1," insert --wherein--

Signed and Sealed this
Ninth Day of July, 2019

Andrei Iancu
*Director of the United States Patent and Trademark Office*